United States Patent [19]
Paglieroni et al.

[11] Patent Number: 5,355,442
[45] Date of Patent: Oct. 11, 1994

[54] TERRAIN VISUALIZATION BY RAY TRACING A CONICAL HEIGHT FIELD TRANSFORMATION

[75] Inventors: David W. Paglieroni, Redwood City; Sidney M. Petersen, Fremont, both of Calif.

[73] Assignee: Loral Aerospace Corp., New York, N.Y.

[21] Appl. No.: 991,136

[22] Filed: Dec. 16, 1992

[51] Int. Cl.$^5$ ............................................. G06F 15/62
[52] U.S. Cl. .................................................. 395/127
[58] Field of Search ................................. 395/125–132, 395/121–124

[56] References Cited

U.S. PATENT DOCUMENTS

| | | | |
|---|---|---|---|
| 3,539,696 | 11/1970 | Sweeney et al. | 35/10.2 |
| 4,583,185 | 4/1986 | Heartz | 364/521 |
| 4,807,158 | 2/1989 | Blanton et al. | 395/125 |
| 4,903,216 | 2/1990 | Huss et al. | 364/518 |
| 4,940,972 | 7/1990 | Mouchot et al. | 340/747 |
| 4,947,347 | 8/1990 | Sato | 364/522 |
| 4,952,922 | 8/1990 | Griffin et al. | 340/729 |
| 4,965,753 | 10/1990 | Kraemer | 364/522 |

*Primary Examiner*—Heather R. Herndon
*Assistant Examiner*—Huynh Ba
*Attorney, Agent, or Firm*—Perman & Green

[57] ABSTRACT

A parametric height-field ray-tracing process facilitates the construction of a perspective view display for terrain visualization by employing a map providing data in the form of a height field and wherein, prior to initiation of a ray tracing program, the set of voxels of the height field is transformed into a set of cones of empty space opening upwardly wherein the location of the vertex of each cone is near the height of the corresponding voxel. Each cone opens to a maximum cone angle which avoids intersection between the surface of the cone and vertical perturbations of the terrain such as buildings or hills. Ray tracing is conducted by calculating intercepts of a ray with surfaces of a succession of cones wherein the next cone of the succession is obtained by selecting the cone having a vertex beneath the location of the previous intersection. This procedure reduces greatly the number of computations required for a ray-tracing program.

5 Claims, 5 Drawing Sheets

TERRAIN VISUALIZATION BY RAY TRACING A CONICAL HEIGHT FIELD TRANSFORMATION

BACKGROUND OF THE INVENTION

This invention relates to terrain visualization as it would appear from a vehicle moving above the earth's surface, the visualization being accomplished by ray tracing a known height field that has been transformed into an array of cones of empty space balanced on points near the terrain and opening upwards while avoiding interception with other vertical protuberances in the earth's surface, thereby to facilitate determination of points where rays through pixels in perspective view displays first pierce terrain at a substantial reduction in computational steps.

Terrain visualization finds much use for simulation of aircraft flight, and for providing a preview of terrain which may be unfamiliar to the pilot. Such visualization has been accomplished by a variety of methods which include the step of generating height data corresponding to each pixel of a perspective view display by a ray tracing technique employing a preexistent map of the earth's surface. The map is a height field containing the height of each point on a grid of the earth's surface. Such height fields may be expressed in terms of volume elements, or voxels, wherein, for example, the rectangular volume elements may differ in height but have bases at height zero.

In the case of a view of terrain from an aircraft flying at altitudes that do not greatly exceed the altitude of objects on the earth's surface, such as tall buildings and hills, such a view which is inclined only slightly relative to the horizon may experience significant blockage of the surface features of the earth by buildings and hills. This blockage adds complexity to the ray tracing procedure because it is necessary to insure that one obtains the intercept of the ray with the obstruction such as the building or the hill, rather than obtaining an erroneous reading of data of terrain blocked from view by tracing the ray to a portion of the earth's surface for which the view is blocked by the obstruction. To ensure accuracy, ray tracing is normally conducted by incrementally stepping along the ray, one voxel at a time, to check for the presence of an obstruction.

A problem arises in that the foregoing ray tracing procedure is unduly time consuming for situations in which terrain visualization displays are to be updated rapidly, as in the case of simulating a rapidly moving aircraft. For example, real time visualization is precluded with available ray tracing procedures. As a result, the utility of ray tracing for terrain visualization is severely restricted.

SUMMARY OF THE INVENTION

The aforementioned problem is overcome and other advantages are provided by a terrain visualization process which, in accordance with the invention, employs a ray tracing procedure in which the number of computational steps is significantly reduced, thereby enabling the visualization process to be accomplished rapidly, and with a significant reduction in the required time for formulating a pictorial representation of the terrain. Real time visualization can be provided by the invention.

In accordance with a feature of the invention, the ray tracing is accomplished with a previously known map of the earth's surface known as a height field. The invention provides a transformation of the height field by placing a cone vertex near the top of each voxel. The vertices are placed at the center near the top of each volume element. Each cone opens upwardly. Each cone's opening angle depends on the configuration of the terrain surrounding the cone. The cone is opened to the maximum extent possible so as to just contact the earth's surface or object thereon, without allowing the conic surface to intersect a nearby object such as a building, a hill, or other protuberance from the earth's surface. Thus, in the case of a height field describing a substantially planar desert having little or no protuberances from the earth's surface, each cone may be opened out to a conic angle of almost 90 degrees, wherein the conic angle is measured between an axis of the cone and a ray which sweeps out the conic surface. In contrast, by way of example, if there is a canyon extending through the desert, a cone located on the canyon floor would have a relatively narrow conic angle, possibly only a few degrees, to avoid intersecting a wall of the canyon.

Ray tracing proceeds in a manner similar to that of conventional ray tracing programs except that, instead of calculating the intercept of a ray with the boundary of each of a succession of numerous voxels, there is calculation of the intercepts of a ray with the surfaces of cones of empty space. This results in fewer computations which are to be made in the practice of the invention relative to the practice of the prior art. For example, in the case of cones located in the foregoing canyon, successive ray intersections with cone surfaces appear close together because of the small conic angles. However, in the case of cones located on the flat surface of the desert, in the foregoing example, a very large distance appears between successive cone intersections because of the relatively large conic angle. Thus, the spatial density of points of intersection that need be calculated for tracing a ray associated with a pixel on the perspective view display varies in accordance with the nature of the terrain. Rapid vertical fluctuations in the terrain introduce numerous calculations per mile of length of the ray while regions of gradual undulation introduce a minimal number of computations per mile of the ray being traced.

In accordance with the ray tracing procedure, as the ray extends from an imaginary aircraft outwardly towards the ground at a slight inclination to the horizon, the first intercept calculation is performed with the conic surface of a cone having a vertex located beneath a starting point on the ray. The next intercept is performed by using a cone having a vertex beneath the location of the first intersection. The third cone employed in the calculation of an intersection has a vertex located beneath the location of the second intersection. This procedure continues by calculation of successive points of intersection with successive cones until an intercept with the earth's surface, or a building or a hill or other object has been obtained. This completes the tracing of that ray, and the procedure can advance to the tracing of the ray for another of the pixels on the display.

BRIEF DESCRIPTION OF THE DRAWING

The aforementioned aspects and other features of the invention are explained in the following description, taken in connection with the accompanying drawing wherein.

DETAILED DESCRIPTION

Figure 1:
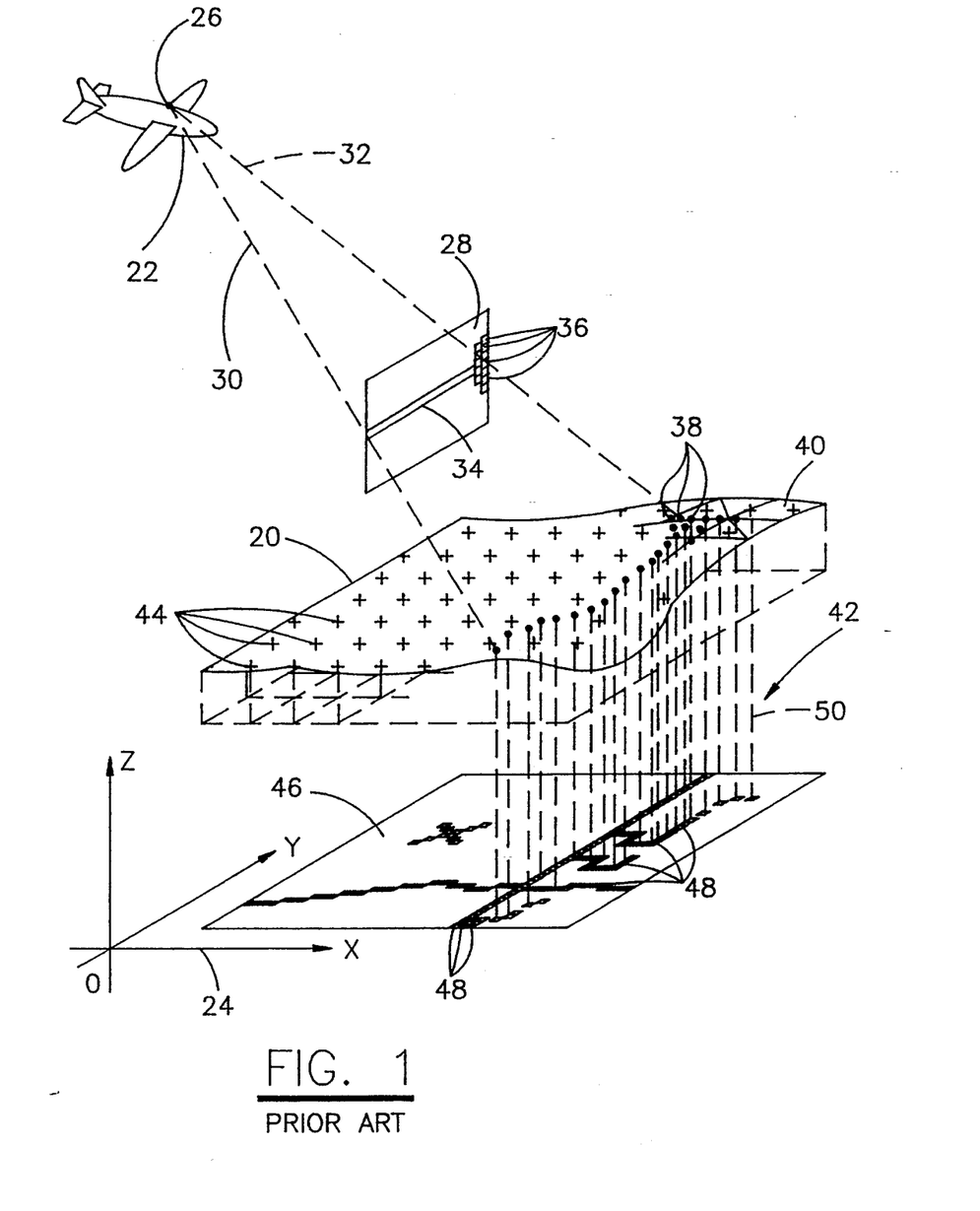
FIG. 1 shows a stylized view of a part of earth's terrain viewed by an aircraft, wherein the terrain is described by a height field.

FIG. 1 shows a portion of earth's terrain 20 viewed by an aircraft 22 flying past the terrain 20 at a viewing angle depressed from the horizontal. A reference frame 24 provides an XYZ coordinate system wherein the XY plane is horizontal and the vertical is represented by the Z axis. A point 26 of observation is located on the aircraft 22, and the terrain 20 is observed via a two-dimensional representation on a planar display, such as a camera focal plane 28, of which extreme rays 30 and 32 at the edge of the display are shown, by way of example. To facilitate construction of the drawing, the focal plane 28 is shown outside the aircraft 22. Scanning of the focal plane 28 may be accomplished along a horizontal scan line 34 of pixels 36, wherein each pixel 36 provides image data of a point of intersection 38 with the surface 40 of the terrain 20 by a ray from the observation point 26. The terrain 20 has undulations described by a height field 42 constructed by projecting grid points 44 of a mesh network of the terrain surface 40 onto a horizontal reference plane, or map 46, composed of a rectangular array of cells 48 which serve as bases of columnar volume elements 50 extending up to the terrain surface.

Figure 2:
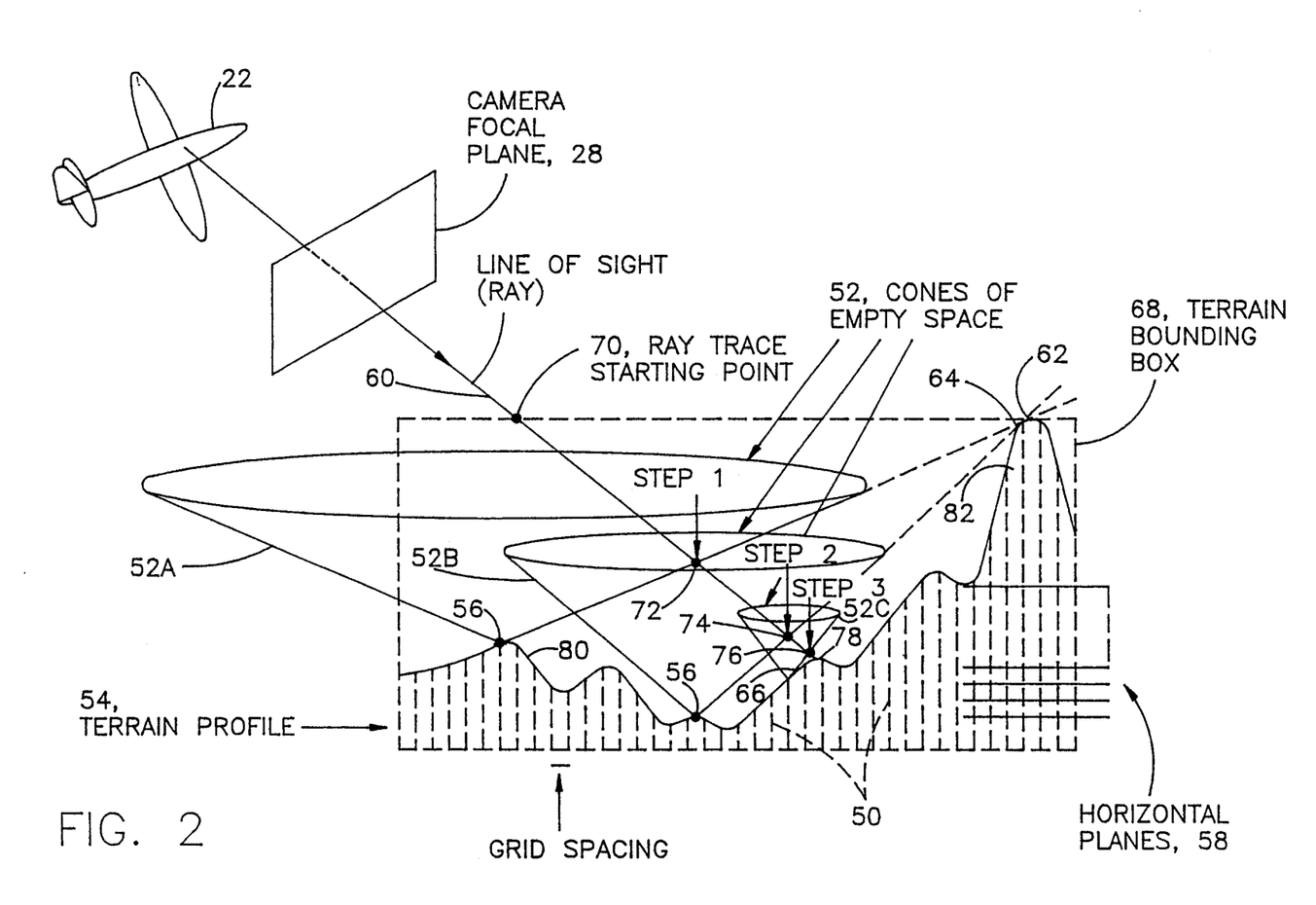
FIG. 2 shows a stylized view of a part of earth's terrain viewed by an aircraft, wherein the terrain is described by a height field, modified by the inclusion of a set of cones of empty space for simplified ray tracing in accordance with the invention.

FIG. 2 shows a view of earth's terrain, similar to that of FIG. 1, but modified in accordance with the invention to include a set of cones 52 of empty space providing further information about the nature of a terrain profile 54. Three of the cones 52 are shown by way of example. There is one cone 52 for each columnar volume element 50. Each cone 52 has a vertex 56 located near the top center of each columnar volume element 50. Each cone of empty space opens upwardly, the conic angle being just large enough to allow some point of the conic surface to contact a point of the earth's surface as indicated by the terrain profile 54. The terrain profile is shown only in two dimensions in FIG. 2, but it is to be understood that the conic surface of each cone 52 extends in three dimensions for contacting the earth's surface. Horizontal planes 58 are provided within the terrain profile 54 to facilitate construction of the cones 52 from data provided by the height field 42. Each cone 52 may be described by its cone angle, measured between the cone axis and a ray which sweeps out the conic surface or, alternatively, may be described by the slope of the ray sweeping out the conic surface wherein the slope is given by the tangent of the cone angle.

Figure 3:
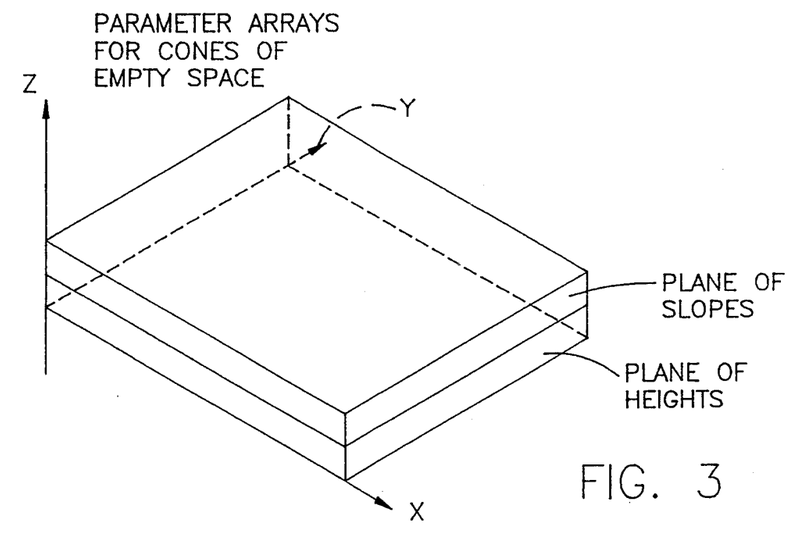
FIG. 3 is a diagrammatic representation of cone field memory.

A feature of the invention is the simplicity by which the cone data may be stored in a memory. A memory, such as is represented by FIG. 3, may store height field data in a planar array of memory cells along an XY plane with X and Y address lines and, by inclusion of an additional plane of cells, may store the slope data for each cone.

The invention employs ray tracing to traverse the ray through each of the pixels 36 of the image displayed in the focal plane 28. Ray tracing has been accomplished in the prior art by a tedious procedure in which the coordinates of points on a ray are computed at the ray intercept with each of the many cells of a height field that the ray passes over from the observation point to the first point of intersection with the surface of a subject being viewed, herein the surface of a portion of the earth's terrain. This procedure was necessary because of the need to examine each cell to determine if it contained an intercept with the surface of the subject matter. This entails a great amount of computer time and precludes the generation of perspective view displays of terrain from height-field data in real-time by ray tracing. However, the invention advantageously provides a great reduction in the amount of computations in the ray trace procedure by only requiring calculations of ray intercept with the surface of each cone 52 in a series of the cones through which a ray, such as a ray 60 (FIG. 2), propagates. However, it is not necessary to compute the intercept with every cone through which the ray 60 propagates; it is necessary to compute the intercepts with only a select series of relatively few cones 52, in accordance with the methodology of the invention, as is now explained.

It is noted that each cone 52 has been constructed with as large a cone angle as possible without intercepting the earths terrain, the opening of the cone 52 being extended only until contact is made between the conic surface and some point of the terrain. This is demonstrated in FIG. 2 which portrays a cross section of a portion of a valley in mountainous terrain. The opening angle of the first of the cones, namely, the cone 52A, is limited by contact with a mountain peak at 62. The opening angle of the second of the cones, namely, the cone 52B, is limited by contact with the same mountain peak at contact point 64. The opening angle of the third of the cones, namely, the cone 52C, is limited by contact with a hill at 66. Therefore, in the tracing of the ray 60 through the empty space enclosed by the cone 52A, it is not necessary to consider intercept with possible subject matter within the cone 52A because it is known, a priori, that the cone 52A is empty, and that there is no subject matter therein.

To demonstrate the procedure of the invention, the terrain is considered bounded by a box 68, and the ray 60 enters the box 68 at a point 70. A cone having a vertex 56 located directly beneath the starting point 70 is selected, this being the cone 52A. As the ray 60 progresses from the starting point 70, it is known that there is no point of interception with terrain within the cone 52A. Accordingly, the first intercept point to be computed is the intercept of the ray 60 with the surface of the cone 52A at point 72. Now, a second cone having a vertex 56 located directly beneath the intercept point 72 is selected, this being the cone 52B. Again, it is known, a priori, that there is no subject matter within the cone 52B. As the ray 60 progresses from the first interception point 72, it is known that there is no point of interception with terrain within the cone 52B. Accordingly, the second intercept point to be computed is the intercept of the ray 60 with the surface of the cone 52B at point 74. Now, a third cone having a vertex 56 located directly beneath the second intercept point 74 is selected, this being the cone 52C. Again, it is known, a priori, that there is no subject matter within the cone 52C. As the ray 60 progresses from the second interception point 74, it is known that there is no point of interception with terrain within the cone 52C. Accordingly, the third intercept point to be computed is the intercept of the ray 60 with the surface of the cone 52C at point 76. The procedure of selecting another cone and computing the next intercept with the ray 60 continues until the ray 60 intercepts the terrain surface at point 78. This completes tracing of the ray 60, and the process of generating the perspective view display on the focal plane 28 continues with selection of a ray for the next pixel in the display.

The number of cones 52 to be employed depends on the configuration of the terrain. For example, the cone 52A is located near the top of a hill 80, the hill 80 being distant from other hills and from the mountain 82, with the result that the cone 52A has a wide cone angle and envelops much empty space. Therefore, a relatively long segment of the path of propagation of the ray 60 can be processed with a single calculation of interception point. The proximity of the cone 52B to the mountain 82, and the proximity of the cone 52C to the side of its hill substantially reduces the respective cone angles with the result that the interception points to be calculated along the path of propagation of the ray 60 are spaced together more closely than with wide cones such as the cone 52A. Therefore, when a ray approaches rugged terrain, more cones will be employed and when a ray approaches relatively smooth terrain fewer cones will be employed. Nevertheless, the number of intercept calculations required is on average generally many times less than the number of ray trace steps required by ray trace processes of the prior art. A further feature of the invention is that the transformation of a height field to a cone field need be performed only once, and is performed off line. The cone field may be used to generate views of terrain at arbitrary perspective. The number of ray tracing steps has been reduced by the invention to such an extent that perspective view displays can be generated on-line. Perspective view displays can be updated numerous times during the course of a flight simulation by using the same cone field. It is advantageous, in the generation of perspective view displays of terrain to include further image data in the nature of color, darkness, or texture, by way of example, by use of gray scale or color presentation wherein, by way of example, pixels showing a deep valley may be colored dark while mountain tops are colored light; also vegetation may be colored green and water may be colored blue, by way of example. Preferably, digitized color photographs of the terrain have been taken previously from different viewing directions, such as east and west, for use of source imagery to be draped over terrain as photo-realistic perspective views are generated. It is advisable to select the source image whose viewing parameters best match those of the perspective view display to be generated.

Figure 4:
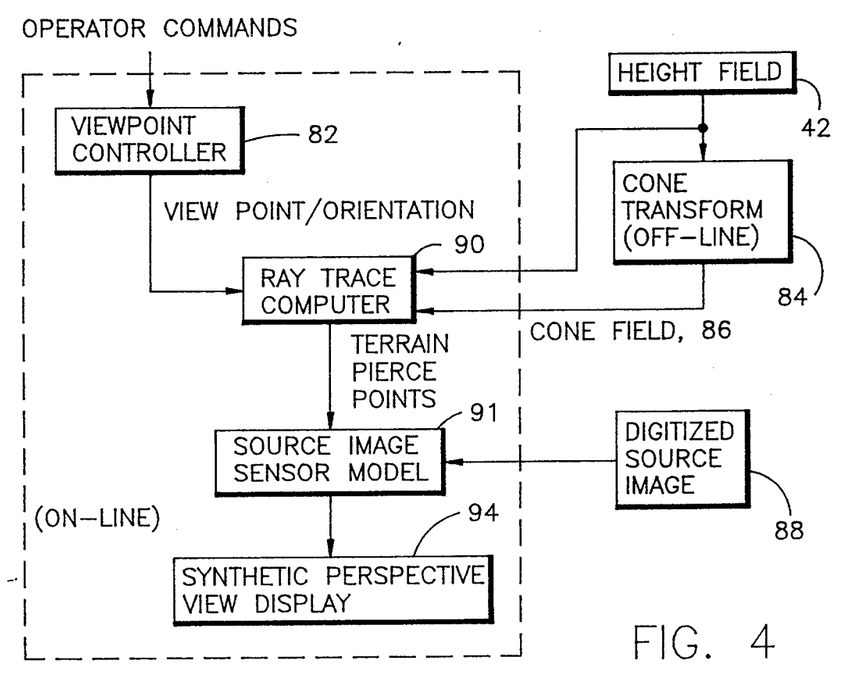
FIG. 4 is a block diagram of the apparatus employing the invention.

The foregoing practice of the invention is taught in FIG. 4 wherein data from the height field 42 is applied to a cone transformation 84 off-line to provide a cone field 86 which is stored in a memory. Additional memory may be employed if desired for storage of source imagery 88 for improved realism to the displayed perspective view. The cone transformation 84 may be fabricated as a computer. The transformation from height field to cone field, and the storage of the cone field is accomplished off-line and prior to generation of perspective view displays. Subsequent on-line generation of perspective view displays involves a ray-trace computer 90 to generate and trace rays through pixels on the display being generated from height field data stored in memory, which is available to the computer 90. Source image pixels associated with pierce points on the ground determined by ray tracing are fetched from the image source 88 by applying source image sensor model 91. In addition, the operator of the simulation controls view point and look-direction by inputting commands to a view point controller 92. The simulator also includes a monitor for presentation of the synthetic perspective view displays 94.

There are two images of concern herein. One of the images is a synthetic image of the subject terrain to be constructed by a perspective view from a desired location, normally, from above and to the side of the subject terrain being viewed. The second of the images is the source image of the terrain produced earlier, as by photographic camera or by synthetic aperture radar, by way of example. The source image most likely is taken from a different viewing direction than the perspective view, and serves the function of providing data of the subject terrain which is useful in enhancing the synthetic image to be constructed, as by color, shading and/or texturing. By implementation of a ray tracing process, there is associated a specific locale on the earth's surface, or terrain, with each pixel of an image, be it the synthetic image or the source image. Thus, the ray tracing process has provided data of a one-to-one correspondence between points on the terrain and pixels of an image.

The source image sensor model 91 provides an analytic mapping from points on the ground to pixel coordinates in the source image 88. The model 91 provides an inverse relationship to the ray trace process, namely, identifying the pixels associated with the points on the terrain. This enables data from the individual pixels of the source image to be employed for enhancing corresponding pixels of the synthetic image by use of information, such as color or shading, which is present in the source image. For this purpose, the source image has been stored previously in digitized form wherein numerical quantities of color or shading, by way of example, are provided for each pixel. It is noted that, in each of the images, the the pixels are addressed by a two-dimensional array of rows and columns, while corresponding points of the terrain are identified by a three-dimensional address of row, column and height. Accordingly, the invention employs a two step process for enhancing the synthetic image. The ray tracing is employed to establish, for the synthetic image, a one-to-one correspondence between image pixels and points of the terrain. The source image sensor model 91 provides, via the inverse relationship or mapping, a one-to-one correspondence between the points of the terrain and the pixels of the source image. Thereby, the ray tracing and the mapping processes have provided a one-to-one correspondence between imagery data in the respective pixels of the source image and the corresponding pixels of the synthetic image. This allows the imagery data of the source image to be employed for enhancement of the synthetic image as is shown in FIG. 4, wherein the terrain pierce points are applied to the model 91 for acquiring imagery data from the source image 88 for enhancement of the perspective view presented on the display 94.

Figure 5:
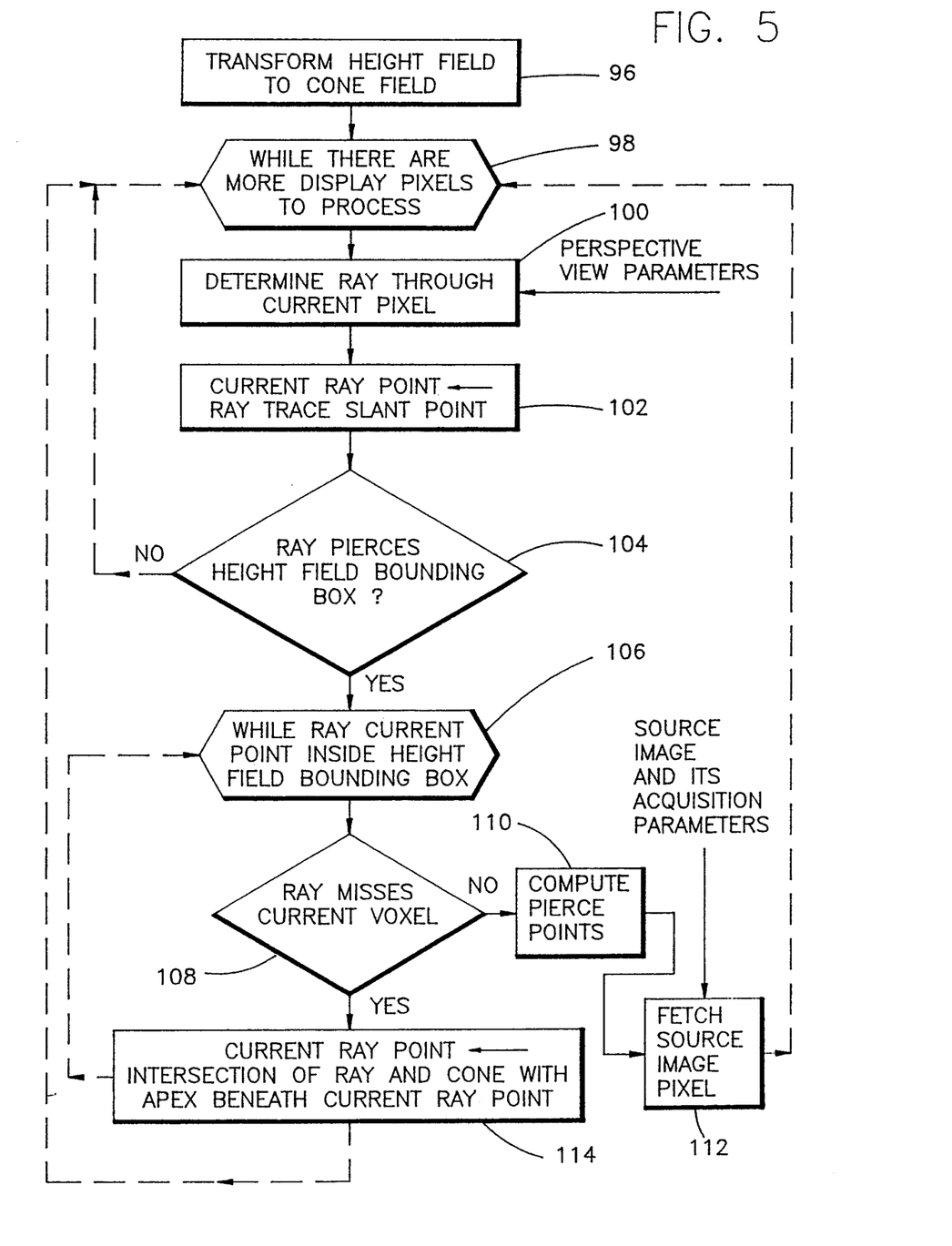
FIG. 5 is a flow chart of a computer program for practicing the invention.

FIG. 5 shows a block diagram in the form of a flow chart explaining steps in the practice of the invention, including steps of the ray tracing procedure performed by the computer 90 of FIG. 4 and described in FIG. 2. In FIG. 5, the process begins at block 96 wherein the conical representation of terrain configuration is obtained by the cone transformer 84 (FIG. 4) preparatory to performance of a ray trace. Once the desired perspective view is identified, the perspective view display is generated on a pixel-by-pixel basis (block 98). For each pixel on the perspective view display, there is an associated ray or line-of-sight through it whose parameters are computed in block 100. Then in block 102, the ray trace procedure begins by selection of a start point (point 70 in FIG. 2). The ray is traced only if it pierces the height field bounding box (block 104). While the ray current point lies inside the height field bounding box, ray tracing continues (block 106). If the ray pierces the voxel associated with the ray current point (block 108), then the pierce-point is calculated in block 110 and the associated source image pixel is fetched in block 112. Otherwise, in block 114, a cone (say cone 52A in FIG. 2) having its vertex 56 beneath the ray current point is identified, the ray (say ray 60) is extended and its intercept with its cone (say cone 52A) is computed. The current ray point is then replaced by the intercept.

Figure 6:
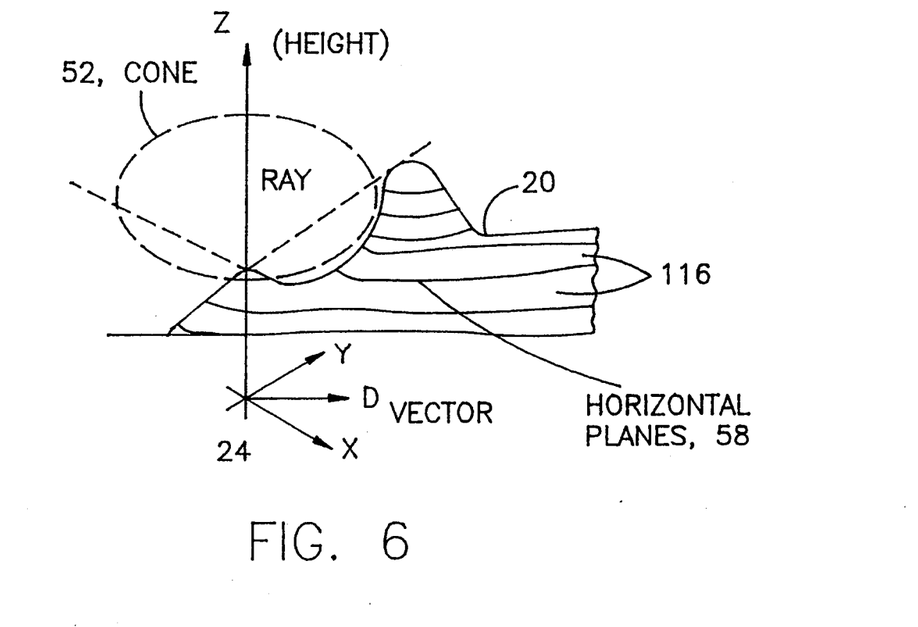
FIG. 6 shows diagrammatically a portion of earth's terrain with a set of horizontal planes used in transforming a height field into cones of empty space.
Figure 7:
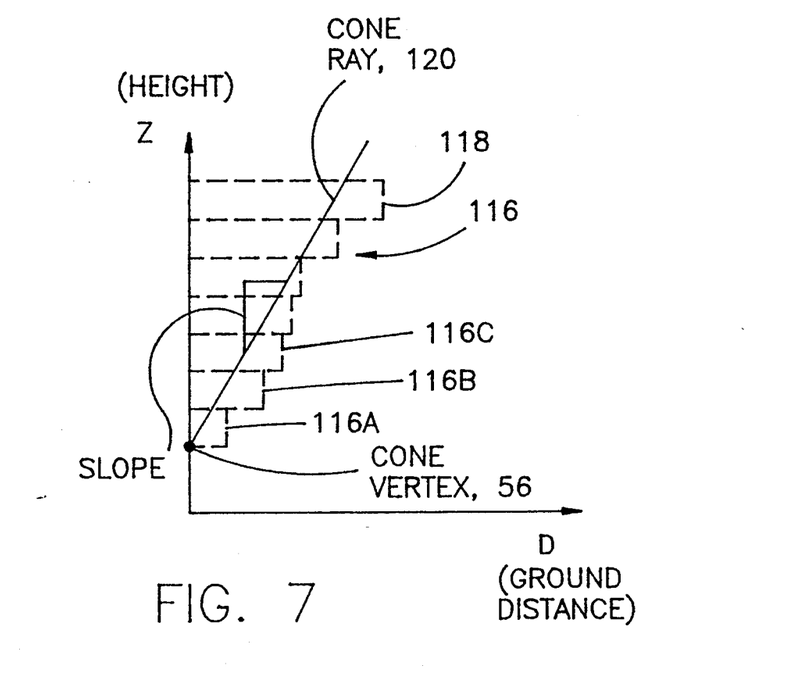
FIG. 7 shows a sequence of terrain altitude steps used to generate a ray which sweeps out a conic surface.

With reference to FIGS. 6 and 7, generation of the height field's cone transform on a general purpose computer, since it is performed off-line, is allowed to take whatever time is necessary. However, in view of the large amount of data to be transformed, the invention provides for the convenience of a rapid calculation of the height field's cone transform. The cone transform is generated by taking horizontal cross-sections (planes 58 in FIGS. 2 and 6) which slice the terrain into a set of vertically stacked slabs 116. Then, within the first of the slabs, slab 116A, located at the cone vertex 56, investigation is performed to locate the nearest protrusion of terrain into the space of the slab 116A by looking in all directions, the instantaneous direction being indicated by the vector D. The location of the protuberance is given by the Vector D as a function of both x and y of the reference frame 24. The procedure is repeated in the next slab 116B located immediately above the slab 116A, and the nearest protrusion of terrain, be it a hill or sloping land or a distant mountain, into the space of the slab 116B is noted. The location of the nearest protrusion in noted in terms of the vector D and, in the case of the slab 116B, occurs for a larger value of D than in the slab 116A. Similarly, in the case of the third slab 116C, the protrusion occurs for a still larger value of D. This relationship is indicated in FIG. 7 wherein the slabs 116A, 116B and 116C are shown drawn with successively larger vector D lengths. The right hand end portions of the slabs 116 of FIG. 7 present the appearance of an irregular staircase 118. Such a staircase is generated for each cell in the height field grid.

The resulting cone ray 120 which sweeps out a conic surface rests against the staircase 118. The slope, m, of the ray 120 describes the cone of largest opening angle which contacts the terrain surface without intersecting it. The slope may be referred to as the slope parameter for designation of a cone description. The cone ray 120 intersects the Z axis of the graph of FIG. 7 at the cone vertex 56, and may be referred to as the intercept parameter. In the general case, the intercept occurs at a value of height, $Z_p$, disposed on a vertically oriented cone axis for each of the numerous cones. The procedure is explained further in the ensuing mathematical description wherein the subscript k is employed as a running index of terms of a series, and the subscripts i and j are employed as running indices of series extending in the X and the Y directions, respectively.

The process of tracing rays in steps along intersections between rays and cones of empty space is referred to herein as parametric height field ray tracing in reference to the parameters (cone width and apex height) of cones of empty space.

Parametric height field ray tracing is a new highly efficient height field ray trace process. The process has two parts. The off-line component generates the parameters of cones of empty space above each height field cell. The on-line component uses the cone parameters to efficiently traverse the ray. The off-line component should be conducted on a general purpose computer. The on-line component can be implemented on rays in series using a general purpose computer, on several rays in parallel using multiple high-speed processors or on all rays in parallel using massively parallel machines. As shown in FIG. 2, the basic idea behind parametric height field ray tracing is that ray traversal progresses along intersections between rays and cones of empty space. Wider cones give rise to improved efficiency. Ray trace step k starts above some cell. This cell has an associated cone. Ray trace step k+1 starts above the cell that lies beneath the point where the ray exits the cone. The new cell has a different cone and ray tracing continues until the ray pierces the cell voxel that it has stepped to or the ray point stepped to is out of height field bounds.

The off-line process that transforms the height field into parameter planes will now be disclosed. First, the height field is converted into an array of height field cells $\{z(i,j)\}$, where the height $z(i,j)$ of cell $(i,j)$ is the height field sample at the tallest corner of cell $(i,j)$. K, the number of height field horizontal cross-sections to process, is specified. These cross-sections occur at evenly spaced heights $z_k$ k=0, ..., K−1. The cross-section at height $z_k$ can be represented as a bit map $\{B_k(i,j)\}$ (a 2D array of 0's and 1's) where $B_k(i,j)$ is 1 only if $z(i,j) \geq z_k$. The distance transform $D_k$ of bit map $B_k$ has elements $D_k(i,j)$ where $D_k(i,j)$ is the Euclidean distance in the $(i,j)$ plane from $(i,j)$ to the closest cell $(i,j)$ for which $B_k(i,j)$ is 1. The $D_k$ can be computed efficiently on a general purpose computer using an established distance transform procedure.

One can envision a stack of distance transform planes arranged in order of increasing cross-section height. For each cell $(i,j)$, there is a sequence of distance values through this stack. This sequence of distance (measured in the plane of the height field grid) plotted against height (the z axis) is nondecreasing as height increases. As shown in FIG. 7, this sequence can be represented by a linear lower bound characterized by a z intercept and a nonnegative slope. The intercept, $z_p(i,j)$, is the height of the apex of a cone of empty space situated above cell $(i,j)$. The slope, $m_p(i,j)$, is the reciprocal of the slope of the ray that sweeps out the cone when spun about its apex. For each cell, the intercept-value is stored in the intercept parameter plane $\{z_p(i,j)\}$ and the slope value is stored in the slope parameter plane $\{m_p(i,j)\}$.

The off-line process for transforming height fields into parameter planes updates the parameter plane each time the distance transform of a new height field cross-section is computed. The process requires memory for only one cross-section and its distance transform plane at a time and is summarized as follows:

Transform from Height Field to Parameter Planes

1. Initialize:

$$\text{status}(i,j), m_p(i,j) \leftarrow 0, z_p(i,j) \leftarrow z_{k-1} \; \forall (i,j)$$

2. for $k=0 \ldots K-2$
   a. Generate $\{B_k(i,j)\}$ and compute $\{D_k(i,j)\}$.
   b. Update the parameter planes:

---
$\forall (i,j)$,
if status$(i,j) = 0$ and $D_k(i,j) \neq 0$ then
  status $(i,j) \leftarrow 1$, $z_p(i,j) \leftarrow z_k$
if status$(i,j) = 1$ then
  $m \leftarrow D_k(i,j)/[z_{k+1} - z_p(i,j)]$
  if $m_p(i,j) = 0$ or $m < m_p(i,j)$ then
    $m_p(i,j) \leftarrow m$
---

The on-line process for parametric ray traversal will now be disclosed. The line on the (z,D) plane represented by the cone parameters associated with cell (i,j) is $$D = m_p(i,j) [z - z_p(i,j)] \qquad (1)$$

A 3D ray can be characterized by a starting point $p_s = [x_s, y_s, z_s]$ and a direction vector $d = [d_x, d_y, d_z]$ $$p = p_s + td \geq 0 \qquad (2)$$

where the variable t specifies distinct points $p = [x,y,z]$ on the ray. The xy distance D traversed, in units of height field cells of size $\Delta$ meters by $\Delta$ meters, from the ray point at height $z_r$ to the ray point at height z is given by $$(d_z \Delta)D = d_r(z - z_r) \qquad (3)$$

where $$d_r = (d_x^2 + d_y^2)^{\frac{1}{2}}$$

For $d_z \neq 0$ (i.e., for rays that are not horizontal), let $$m_r = d_r/(d_z \Delta). \qquad (5)$$

Then the intersection $[z^*, D^*]$ between the 2D lines (1) and (3) is given by $$(6) \; z^* = \begin{cases} z_r & d_z = 0 \\ \dfrac{m_p(i,j)z_p(i,j) - m_r z_r}{m_p(i,j) - m_r} & d_z \neq 0, m_p(i,j) \neq m_r \\ \text{undefined} & d_z \neq 0, m_p(i,j) = m_r \end{cases}$$

$$(7) \; D^* = \begin{cases} m_p(i,j)[z^* - z_p(i,j)] & z^* \text{ defined} \\ \text{undefined} & z^* \text{ undefined} \end{cases}$$

The ray point an xy distance $D^*$ from the ray point $p_r = [x_r, y_r, z_r]$ has coordinates $p^* = [x^*, y^*, z^*]$ where $$(8) \; [x^*, y^*] = \begin{cases} [x_r + (z^* - z_r)d_x/d_z, y_r + (z^* - z_r)d_y/d_z] & d_z \neq 0 \\ [x_r + (D^*\Delta)d_x/d_r, y_r + (D^*\Delta)d_y/d_r] & d_z = 0 \end{cases}$$

The ray point $P_r$ starts above some height field cell. The ray exits the cone of empty space associated with that cell at the point p*. If p* lies above a new cell that the ray pierces or p* is out of height field bounds, ray tracing is complete. If p* lies above a new cell that the ray does not pierce, $P_r$ is replaced by p* and ray tracing continues. If p* and $P_r$ lie above the same cell, the parametric ray trace process is jump-started by stepping incrementally to the next height field cell.

The on-line parametric height field ray traversal process is summarized as follows:

Parametric Height Field Ray Traversal Process

1. Initialize:
   Determine starting point $P_r$, starting cell (i,j).
2. Compute pierce-point:
   if ray pierces cell (i,j) then return pierce-point
3. Determine next parametric ray trace step:
   if $z_r \geq z(i,j)$ then ---
a. if $d_z > 0$ and $z_r > z_p(i,j)$ and $m_r \leq m_p(i,j)$
   then return
b. Compute $D^*$, $p^*$.
c. if $D^* > 0$ then $p_r \leftarrow p^*$
d. if $p_r$ out of bounds then return
e. $(i',j') \leftarrow (i,j)$, $(i,j) \leftarrow$ cell under $p_r$
---

4. Jump-start the process:
   if $z_r < z(i,j)$ or $(i,j) = (i',j')$ then step incrementally to next point $P_r$, next cell (i,j)
5. Go to step 2.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A process of generating a perspective view of a subject from a three-dimensional height field representation of a surface of the subject, the height field representation being composed of a set of columnar cells extending from a horizontal base plane upward to the subject surface, the process comprising the steps of:
   selecting a viewing location above the subject;
   transforming said height field by placing upon respective ones of said columnar cells vertices of respective ones of a plurality of cones wherein, for each of said columnar cells, the horizontal and the vertical coordinates of the corresponding cone vertex are near the horizontal and vertical coordinates of an intersection of the columnar cell with the subject surface, said transforming step further comprising a step of opening each cone of said plurality of cones in an upward direction to a maximum cone angle which avoids intersection of the surface of the cone with the surface of the subject;
   performing a ray tracing procedure with each of numerous rays from said viewing location to said subject wherein each of said rays corresponds to one pixel of the perspective view, said ray tracing procedure comprising, for each of said rays, steps of:

selecting on the ray a ray-trace start point;

initially tracing the ray from said start point to a first intercept with the conical surface of a first cone of said plurality of cones, said first cone extending from a vertex located on the subject surface beneath said start point;

further tracing the ray from the first intercept to a second intercept with the conical surface of a second cone of said plurality of cones, said second cone extending from a vertex located on the subject surface beneath said first intercept; and continuing with the tracing of the ray through further intercepts with conical surfaces of successive cones of said plurality of cones wherein the Nth intercept occurs with the conical surface of the Nth cone, and the vertex of the Nth cone is located on the subject surface beneath the (N−1)th intercept, the tracing of the ray continuing until the ray intercepts with a columnar cell of said set of columnar cells of said height field representation of the subject surface.

2. A process according to claim 1 wherein the subject is earth's terrain, the process further comprising:

obtaining a source view of the subject, the source view including at least one feature of a class of pictorial features of color, darkness, and texture; and applying said at least one pictorial feature to individual pixels of said perspective view.

3. A process according to claim 1 wherein the subject is earth's terrain and the viewing location is under control of the operation of the simulation, said transformation is accomplished prior to simulation, and said ray tracing steps are accomplished concurrently with change in view point to provide a real-time perspective view.

4. A process according to claim 3 further comprising steps of obtaining a source view of the subject, the source view including at least one feature of a class of pictorial features of color, darkness, and texture; and applying said at least one pictorial feature to individual pixels of said perspective view.

5. A process according to claim 4 wherein said transformation includes storing transformed height field data as a function of two parameters for each data point of the subject surface, each of the data points being identified by its location as projected on said horizontal base plane, wherein one of said parameters is the height of the apex of a cone of empty space near the data point and the other parameter is the width or slope of the cone balanced on its apex.

* * * * *